United States Patent
Atkinson

(10) Patent No.: US 9,491,403 B2
(45) Date of Patent: *Nov. 8, 2016

(54) MODIFICATION OF IMAGES BASED ON ORIENTATION

(71) Applicant: HEWLETT-PACKARD DEVELOPMENT COMPANY, L.P., Houston, TX (US)

(72) Inventor: Lee Warren Atkinson, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/141,861

(22) Filed: Apr. 29, 2016

(65) Prior Publication Data

US 2016/0249015 A1 Aug. 25, 2016

Related U.S. Application Data

(63) Continuation of application No. 14/948,946, filed on Nov. 23, 2015, now Pat. No. 9,357,140, which is a continuation of application No. 14/351,263, filed as application No. PCT/US2011/064249 on Dec. 9, 2011, now Pat. No. 9,215,405.

(51) Int. Cl.
| | |
|---|---|
| *H04N 7/14* | (2006.01) |
| *H04N 5/262* | (2006.01) |
| *G06F 3/0346* | (2013.01) |

(52) U.S. Cl.
CPC ............ *H04N 7/141* (2013.01); *G06F 3/0346* (2013.01); *H04N 5/2628* (2013.01)

(58) Field of Classification Search
CPC ....................................................... H04N 7/14

USPC ...................... 348/14.01, 14.02, 14.07, 14.12
See application file for complete search history.

(56) References Cited

U.S. PATENT DOCUMENTS

| | | | |
|---|---|---|---|
| 5,900,909 A * | 5/1999 | Parulski | ............... H04N 1/2112 348/231.6 |
| 6,011,585 A | 1/2000 | Anderson | |
| 6,262,769 B1 | 7/2001 | Anderson et al. | |
| 7,148,911 B1 | 12/2006 | Mitsui et al. | |
| 7,706,579 B2 | 4/2010 | Oijer | |
| 8,542,265 B1 | 9/2013 | Dodd et al. | |
| 2001/0008412 A1 | 7/2001 | Ando et al. | |
| 2007/0296820 A1 | 12/2007 | Lonn | |
| 2008/0152199 A1 | 6/2008 | Oijer | |
| 2008/0291221 A1 | 11/2008 | Yamada et al. | |
| 2010/0149398 A1 | 6/2010 | Gayer | |
| 2011/0193982 A1 | 8/2011 | Kook et al. | |
| 2011/0249073 A1 | 10/2011 | Cranfill et al. | |
| 2012/0086819 A1 | 4/2012 | Wilson et al. | |
| 2012/0176396 A1 * | 7/2012 | Harper | ................. G06F 3/1431 345/589 |
| 2013/0222516 A1 | 8/2013 | Do et al. | |
| 2016/0080650 A1 * | 3/2016 | Okazawa | ........... H04N 21/4312 348/36 |
| 2016/0085266 A1 * | 3/2016 | Lee | ...................... H04N 5/2628 348/240.2 |

* cited by examiner

FOREIGN PATENT DOCUMENTS

EP 2280331 A1 2/2011

*Primary Examiner* — Olisa Anwah
(74) *Attorney, Agent, or Firm* — Trop, Pruner & Hu

(57) ABSTRACT

An image can be sensed at a first device. The image can have a first orientation. A second orientation expected by or associated with a second device can be determined. The image can be modified so that the image has the second orientation if the first orientation differs from the second orientation. The modified image can be transmitted to the second device.

20 Claims, 9 Drawing Sheets

MODIFICATION OF IMAGES BASED ON ORIENTATION

CROSS-REFERENCE TO RELATED APPLICATIONS

This is a continuation of U.S. application Ser. No. 14/948,946, filed Nov. 23, 2015, which is a continuation of U.S. application Ser. No. 14/351,263, filed Apr. 11, 2014, now U.S. Pat. No. 9,215,405, issued Dec. 15, 2015, which is a national stage application under 35 U.S.C. §371 of PCT/US2011/064249, filed Dec. 9, 2011, both hereby incorporated by reference.

BACKGROUND

With the popularity of computing devices, digital communication is becoming common. Some devices, such as smart phones, have cameras that allow a user to conduct video calls with other users. Manufacturers of these devices are challenged with enabling consumer-friendly usage of these devices. For example, enabling devices to perform hassle-free video conferencing irrespective of user actions may be desired.

BRIEF DESCRIPTION OF DRAWINGS

The following detailed description refers to the drawings, wherein.

DETAILED DESCRIPTION

Figure 1A:
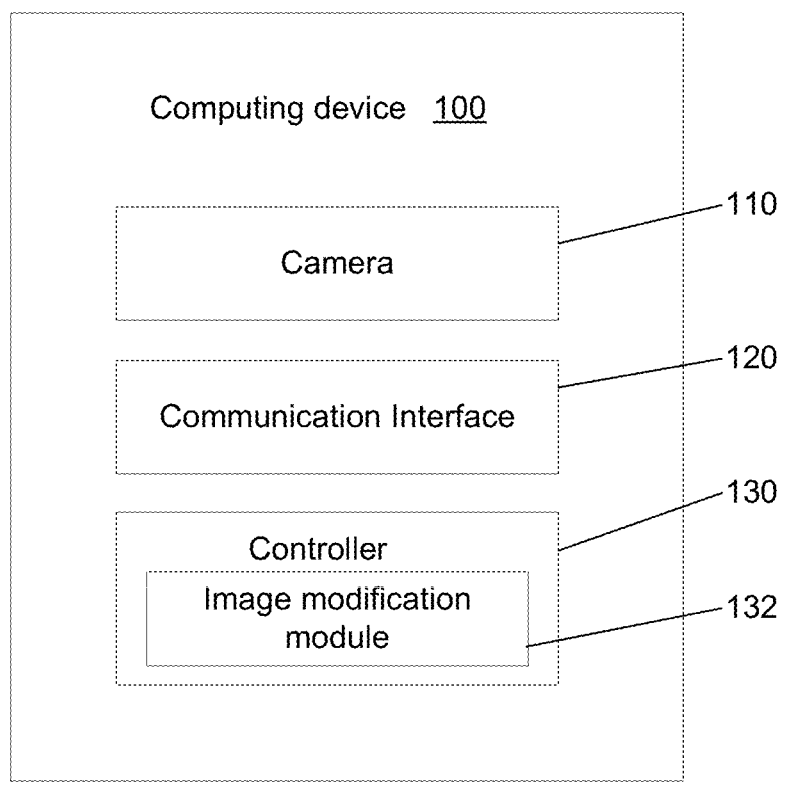
FIG. 1a is a block diagram illustrating a computing device including a camera and a controller to modify image data, according to an example.

Manufacturers of computing devices, such as smart phones, tablet and slate computers, laptop computers, and the like, are challenged with enabling consumer friendly usage of these devices. Furthermore, as digital communication, such as video calling, is becoming more common, users are coming to expect hassle-free communication using their computing devices. As described in detail below, various example embodiments relate to image transfer techniques that enable easy, hassle-free communication between devices.

For example, during a video call, two communication devices with cameras may be oriented in portrait mode. If one of the users subsequently orients his communication device to landscape mode, a complication can arise because the camera of that device is then also oriented in landscape mode. As a result, an image transferred to the other device may in turn be oriented in landscape mode. If the situation is left undetected, when the receiving device, which is still in portrait orientation, displays the image, the image may appear sideways relative to the user of the receiving device, resulting in a poor user experience.

According to an example embodiment, however, the sending device can detect that a sensed image is in an unexpected orientation and can modify the image so that it is in an expected orientation. Furthermore, the sending device can modify the image so that the image has an aspect ratio expected by the receiving device. As a result, the receiving device can receive an image in an expected orientation with an expected aspect ratio even despite a change of orientation and aspect ratio by the sending device.

There are many advantages to such an embodiment. For instance, as a preliminary matter, correctly oriented images may be provided to a receiving device despite changes in orientation by the sending device. This can result in a smooth, fluid, user-friendly video call between users of similar or disparate communication devices. Second, due to the change in aspect ratio, more of the screen real estate of the second device may be used during the video conversation, as opposed to displaying the entire landscape oriented image in a smaller display area of the portrait-oriented receiving device, for example. Moreover, these benefits can be achieved even if the receiving device does not have the graphic processing capability to evaluate incoming image data and alter it so that the underlying image is displayed in a suitable fashion.

Other benefits relate to a reduction in data needed to be sent to the receiving device. For example, image orientation information need not be sent along with every image since the sent images may be already oriented according to the orientation expected by the receiving device. Additionally, the amount of image data transferred to the receiving device may be reduced due to the change in aspect ratio on the sending side. Further details of this embodiment and associated advantages, as well as of other embodiments and applications, will be discussed in more detail below with reference to the drawings.

Referring now to the drawings, FIG. 1a is a block diagram illustrating an embodiment of a computing device 100 including a camera 110, a communication interface 120, and a controller 130. Computing device 100 may be any of a variety of computing devices. For example, computing device 100 may be a cellular telephone, a smart phone, a tablet or slate computer, a laptop computer, or a desktop computer, among others.

Computing device 100 may include a camera. Camera 110 may be a digital camera integrated into computing device 100, attached thereto, or integrated into or attached to a monitor associated with computing device 100. Camera 110 may be or include an image sensor. For example, the image sensor may be a charge coupled device (CCD) image sensor or a complementary metal oxide semiconductor (CMOS) image sensor. Camera 110 may be used for snapping still images or for capturing video image frames. Camera 110 may include a processor, such as a digital signal processor, but may also be controlled by a separate processor in computing device 100 (e.g., controller 130).

Images or video image frames (referred to below as "images") generated by camera 110 may be transmitted to another computing device via communication interface 120. Communication interface 120 may include, for example, a transmitter that may convert electronic signals to radio frequency (RF) signals and/or a receiver that may convert RF signals to electronic signals. Alternatively, communication interface 120 may include a transceiver to perform functions of both the transmitter and receiver. Communication interface 120 may further include or connect to an antenna assembly to transmit and receive the RF signals over the air. Communication interface 120 may communicate with a network, such as a wireless network, a cellular network, a local area network, a wide area network, a telephone network, an intranet, the Internet, or a combination thereof. Communication interface 120 may also include an Ethernet connection or other direct connection to a network.

Computing device 100 may include controller 130 having image modification module 132. Controller 130 may include a processor and a memory for implementing image modification module 132. The processor may include at least one central processing unit (CPU), at least one semiconductor-based microprocessor, at least one digital signal processor (DSP) such as a digital image processing unit, other hardware devices or processing elements suitable to retrieve and execute instructions stored in memory, or combinations thereof. The processor can include single or multiple cores on a chip, multiple cores across multiple chips, multiple cores across multiple devices, or combinations thereof. The processor may fetch, decode, and execute instructions from memory to perform various functions, such as generating, processing, and transmitting image data. As an alternative or in addition to retrieving and executing instructions, the processor may include at least one integrated circuit (IC), other control logic, other electronic circuits, or combinations thereof that include a number of electronic components for performing various tasks or functions.

Controller 130 may include memory, such as a machine-readable storage medium. The machine-readable storage medium may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium can be computer-readable and non-transitory.

In an embodiment, camera 110 may generate image data. For example, a user may be positioned in front of camera 110 and camera 110 can capture the user's image. Camera 110 may generate the image data in response to a command from the user. Alternatively, the user may be engaged in a video call with another device, and thus camera 110 may generate image data automatically as part of a video stream to be sent to the other device.

Communication interface 120 may receive a display orientation and a display aspect ratio from another computing device. For example, the other computing device may be a device with which computing device 100 is communicating via a video call, as described above.

The display orientation and display aspect ratio received from the other computing device may simply be a default orientation and an aspect ratio associated with the default orientation. For example, the default orientation may be portrait orientation or landscape orientation. The default aspect ratio may thus be determined based on whether the default orientation is portrait orientation or landscape orientation. Alternatively, the display orientation may correspond to a current orientation of the display of the other computing device. In this case, the display aspect ratio may be an aspect ratio associated with the current orientation of the display of the other computing device.

For instance, if the display orientation is portrait, the display aspect ratio may be an aspect ratio that is displayable in portrait orientation. For example, the display aspect ratio may be the ratio of the width of the display area to the height of the display area when the display is in portrait orientation. Similarly, if the display orientation is landscape, the display aspect ratio may be the ratio of the width of the display area to the height of the display area when the display is in landscape orientation. The width and height may be measured in units, such as the number of pixels along each dimension. In one example, an aspect ratio associated with landscape orientation of a display can be 16:9, while an aspect ratio associated with portrait orientation of the same display can be 9:16.

The image data generated by camera 110 may be compared to the display orientation and display aspect ratio received from the other device. For example, an image orientation and image aspect ratio of the image data may be compared to the display orientation and display aspect ratio. The image orientation may correspond to the orientation of computing device 100 or of camera 110 when the image data was generated. Alternatively, the image orientation may correspond to the orientation of the image represented by the image data. The image aspect ratio may be an aspect ratio of the image represented by the image data when the image data is arranged according to the image orientation.

Image modification module 132 of controller 130 may change the image orientation and image aspect ratio of the image data to the display orientation and display aspect ratio if the image orientation is different from the display orientation. Accordingly, for example, if the image orientation is landscape and the display orientation is portrait, then the controller may modify the image data so that it represents an image having portrait orientation and the associated aspect ratio. Example processing related to the image modification module 132 is described in further detail below with reference to FIGS. 3 and 4.

Communication interface 120 may transmit the modified image data to the other device.

Figure 1B:
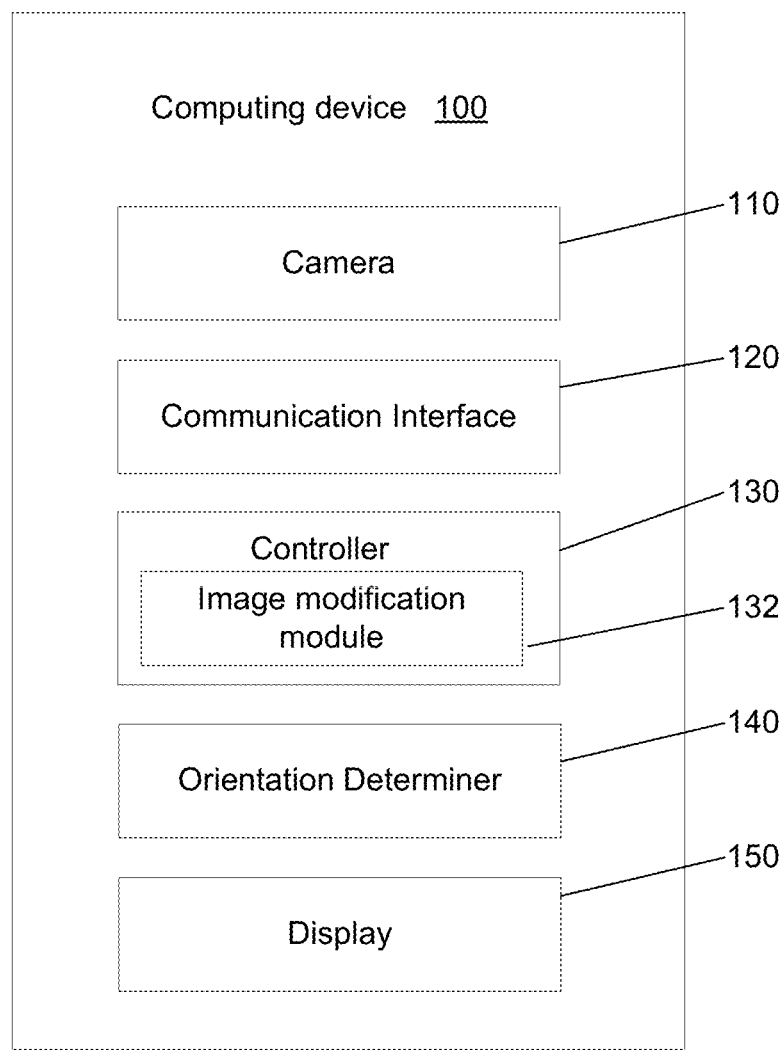
FIG. 1b is a block diagram illustrating a computing device including a camera, an orientation determiner, and a controller to modify image data, according to an example.

FIG. 1b is a block diagram illustrating an embodiment of a computing device 100 including a camera 110, a communication interface 120, and a controller 130, as depicted in FIG. 1a, and further including an orientation determiner 140 and a display 150.

Orientation determiner 140 may include a sensor configured to sense an orientation of computing device 100, of camera 110, and/or of display 150. For example, orientation determiner 140 may include an accelerometer. A current reading or value from the accelerometer may be used to determine orientation. Such orientation could then be used to imply the orientation of an image generated by camera 110. Other sensors suitable for detecting orientation may also be used. Alternatively, or in addition to such a sensor, orientation determiner 140 may include logic, such as machine-readable instructions, for detecting and recognizing objects in an image represented by image data, and determining the orientation of the objects. Thus, for example, facial recognition techniques may be used to infer the orientation of an image generated by camera 110. Orientation determiner may be implemented using controller 130, using a digital signal processor of camera 110, or using another processor, in combination with instructions stored in memory.

Display 150 may be any of various display screens. For example, display 150 may be a display integrated into computing device 100, such as in the case of smart phones and tablet computers. Display 150 may also be a display remotely connected to computing device 100. Furthermore, display 150 may be a touch sensitive display. Display 150 may be used for various purposes, such as to display a user interface, to preview images to be captured by camera 110, and to conduct video calls with other devices.

Computing device 100 may include additional features as well, beyond those depicted in FIGS. 1a and 1b. In addition, other devices that may communicate with computing device 100, such as in a video call, may have some or all of these features described with respect to computing device 100.

Figure 2:
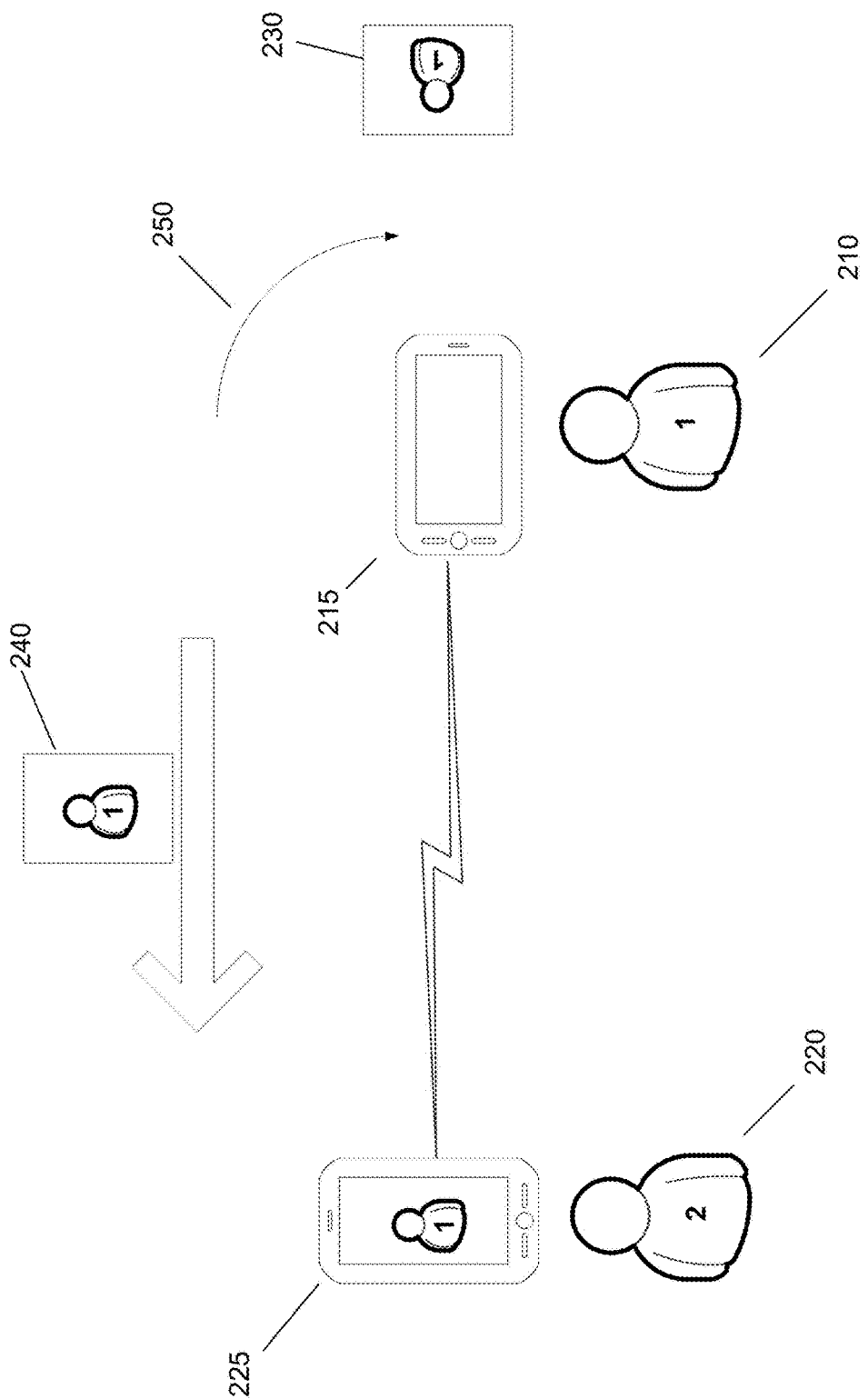
FIG. 2 is a depiction of a sample use case relating to devices and methods disclosed herein, according to an example.

FIG. 2 illustrates a sample use case according to an example. Users 210 and 220 are engaged in a video call using smart phones 215 and 225. The video call may be conducted and the image data transferred according to various standards and technologies such as Session Initiation Protocol (SIP), Real-time Transport Protocol (RTP), Secure Real-time Transport Protocol (SRTP), H.264, H.323, and the like.

For simplification, FIG. 2 depicts the processing of a sensed image from the perspective of smart phone 215, which can be considered the sending device. In addition, it is assumed that at the beginning of the call both smart phones were in portrait orientation and agreed to set portrait orientation as an expected orientation for transferred image data.

An expected orientation may be an orientation that a receiving device expects to receive from a sending device. For example, the receiving device may be configured to process any received image data as if it is in the expected orientation. In other words, the receiving device may assume that any received image data is in the expected orientation. Additionally, an expected orientation may be an orientation that a sending device assumes that the receiving device is configured to receive (e.g., when the expected orientation is set as a default without explicit acknowledgement by the receiving device).

In one example, as described in more detail below with reference to FIG. 6, the expected orientation can be agreed upon based upon one of the devices sending portrait orientation as a suggested orientation to the other device. Accordingly, based on the set expected orientation, image data sent from smart phone 215 to 225 may be interpreted by smart phone 225 as in portrait orientation. In addition, an aspect ratio associated with the expected orientation may be set. In the case of an expected orientation of portrait, the associated aspect ratio may be, for example, 9:16. This aspect ratio may have been selected for a variety of reasons, such as because it is the aspect ratio of the display of smart phone 225 when it is in portrait orientation, for example. The expected orientation and associated aspect ratio may be determined in other ways, as well. For instance, the expected orientation and associated aspect ratio may be default values hard-coded into a computer program used by one or both smart phones. Of course, in such a case, it could be possible for the smart phones to later agree to a different orientation and aspect ratio.

As illustrated by arrow 250, however, user 210 has rotated his smart phone 215 to landscape orientation. As a result, the camera on smart phone 215 is now also in landscape orientation. Accordingly, without intervention, an image captured by smart phone 215 would be transmitted to smart phone 225 and interpreted by smart phone 225 in portrait orientation, as shown in image 230. As can be seen, the image of user 210 in image 230 is sideways. This could result in a poor video call experience for user 220.

According to this example, however, the orientation of the captured image may be detected by smart phone 215. In particular, smart phone 215 may determine that the image represented by image 230 is in landscape orientation. Smart phone 215 may thus modify the image data so that the underlying image is correctly oriented. In addition, smart phone 215 can determine that the aspect ratio of the image should be changed as well, since image 230 has a landscape aspect ratio when correctly oriented. Accordingly, smart phone 215 may modify the image data so that the underlying image has a portrait aspect ratio. An example of these modification processes is explained below with reference to FIG. 3.

After modification, the modified image data may be transmitted to smart phone 225 as image 240. As can be seen, the image of user 210 is correctly oriented and the aspect ratio corresponds to portrait orientation. Consequently, smart phone 225 may display image 240 without having to detect and change the orientation even though the raw image data snapped by smart phone 215's camera was in a different orientation.

Figure 3:
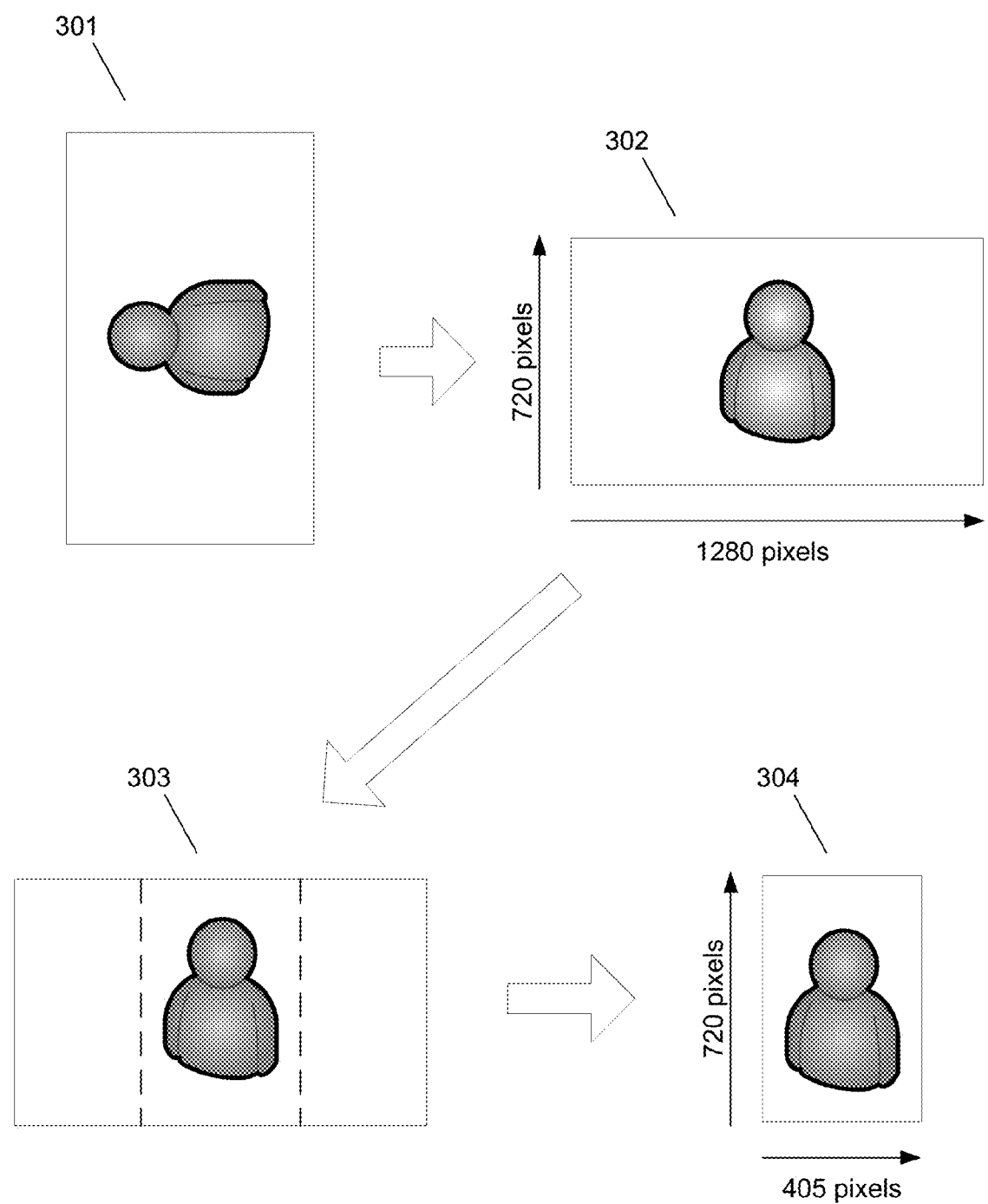
FIG. 3 is a depiction of aspects of an image modification process, according to an example.

FIG. 3 illustrates an example of how image 230 can be converted into image 240. When the camera of smart phone 215 generates image data while in landscape orientation, the raw image data may form an image as shown in image 301. That is, since portrait orientation has been selected as the default orientation, the image data may form a portrait oriented image where the user 210 is depicted sideways.

When smart phone 215 determines that the correct orientation of the image is landscape, smart phone 215 can rotate the image so that it appears as shown in image 302. Rotation of the image can be accomplished using image processing techniques, such as by using a transformation matrix. This type of processing may be easily performed by a digital signal processor. Alternatively, another processor of smart phone 215 may also be used.

Image 302 has a resolution of 1280 pixels by 720 pixels (1280×720), which may correspond to the resolution of the image sensor in the camera of smart phone 215. Image 302 has an aspect ratio defined by the width of the image by the height of the image when correctly oriented (i.e., in landscape orientation). Accordingly, the image aspect ratio is 16:9.

Although the depiction of user 210 is now correctly oriented, the image is still not in portrait orientation with an associated aspect ratio (width×height) of 9:16. Accordingly, smart phone 215 may use image processing techniques to modify the image so that is has portrait orientation with an aspect ratio of 9:16. For example, smart phone 215 may crop the image, as shown in image 303. In this case, the left and right outer sections of image 303 may be cropped to change the aspect ratio of the image. Alternatively or additionally, the image, or a portion thereof, may be scaled to resize the image. Scaling can be performed to either increase or decrease the size of the image.

In an embodiment, the image may be scaled or cropped in such a way as to preserve the depiction of a face or some other object in the final image. For example, facial recognition techniques may be used to detect the presence of a face in some area of the image, and the cropping and/or scaling may be performed around the detected face. In another embodiment, it can be assumed that a face would appear in a certain area of the raw image data based on an orientation of computing device 100 or camera 110, and the cropping and/or scaling may be performed around that area. This may save processing power and time since facial recognition processing would not be performed.

As a result of the above described processing, image 304 may be produced. Image 304 is in portrait orientation and depicts user 210 in the correct orientation. Image 304's resolution is 720 pixels by 405 pixels (720×405) as a result of the cropping and/or scaling. Furthermore, the image aspect ratio (width×height) is 9:16. Since a portrait oriented image with an aspect ratio of 9:16 is what smart phone 225 is expecting, image 304 may be transmitted to smart phone 225 and be displayed on smart phone 225's display without additional processing by smart phone 225.

Of course, since the resolution of the image has changed (from 1280×720 to 720×405), smart phone 225 may scale received image 304. In particular, if the display of smart phone 225 can display a portrait oriented image of greater resolution than 720×405, then scaling can be used so that the image fills the entire display screen.

Figure 4:
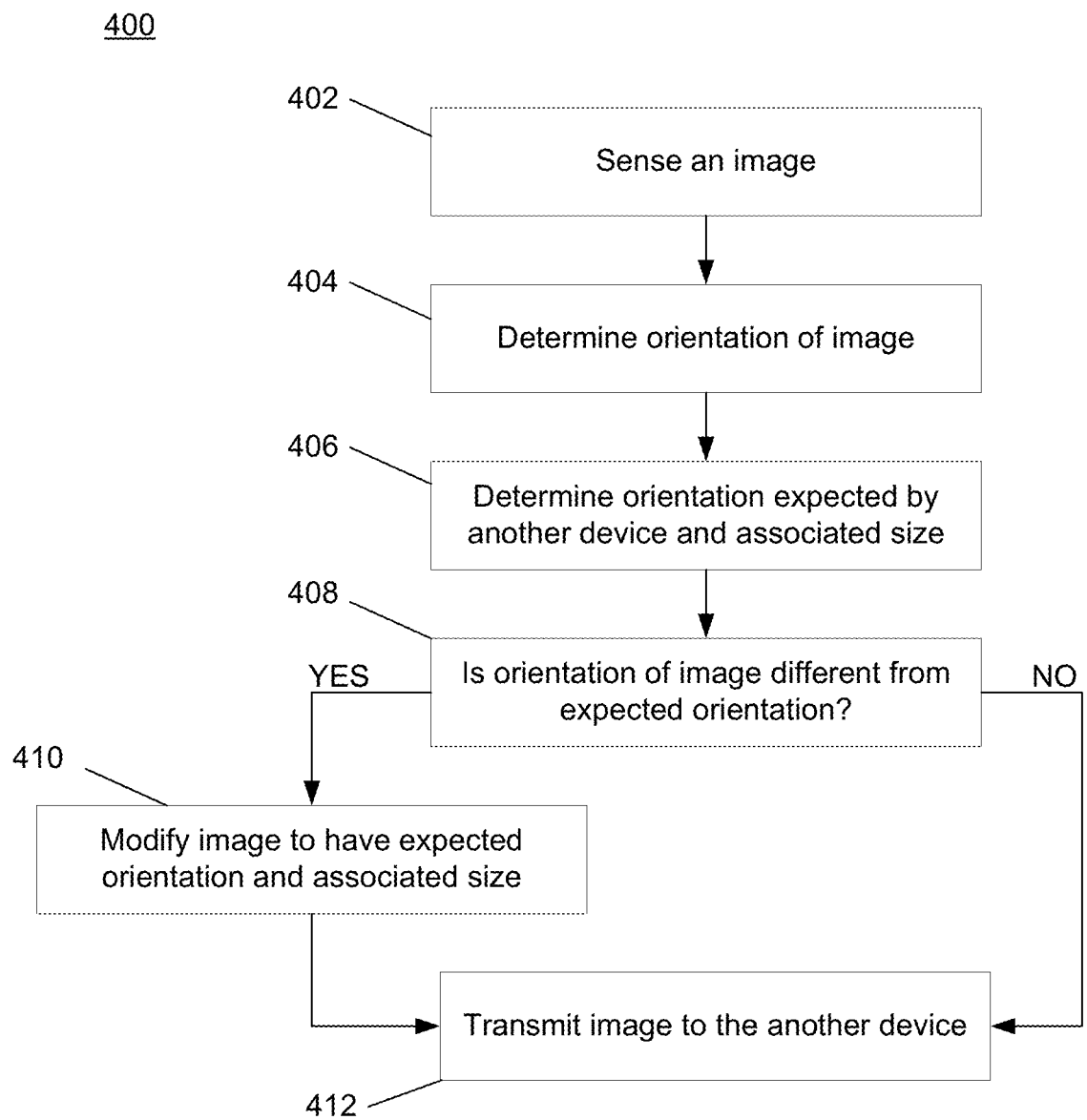
FIG. 4 is a flowchart illustrating aspects of a method for sensing an image, modifying the image, and transmitting the image to another device, according to an example.

FIG. 4 is a flowchart illustrating aspects of a method 400 executed by a computing device for sensing an image and transmitting it to another device, according to an embodiment. Although execution of method 400 is described below with reference to the components of computing device 100, other suitable components for execution of method 400 can be used. Method 400 may be implemented in the form of executable instructions stored on a machine-readable medium or in the form of electronic circuitry. A processor, a machine-readable storage medium, other control logic, or a combination thereof can be used to execute method 400.

Method 400 may start at 402 where an image may be sensed. For example, computing device 100 may sense an image using camera 110. Method 400 may proceed to 404 where the orientation of the sensed image may be determined. Computing device 100 may determine the orientation of the sensed image using orientation determiner 140. For example, an orientation sensor such as an accelerometer may be used to determine the orientation of computing device 100, camera 110, or display 150. The determined orientation may be used as a proxy for the orientation of the image. Alternatively or additionally, object recognition techniques may be used to detect an object (e.g., a face) in the image. The orientation of the object may be determined and used as a proxy for the orientation of the image.

Figure 5:
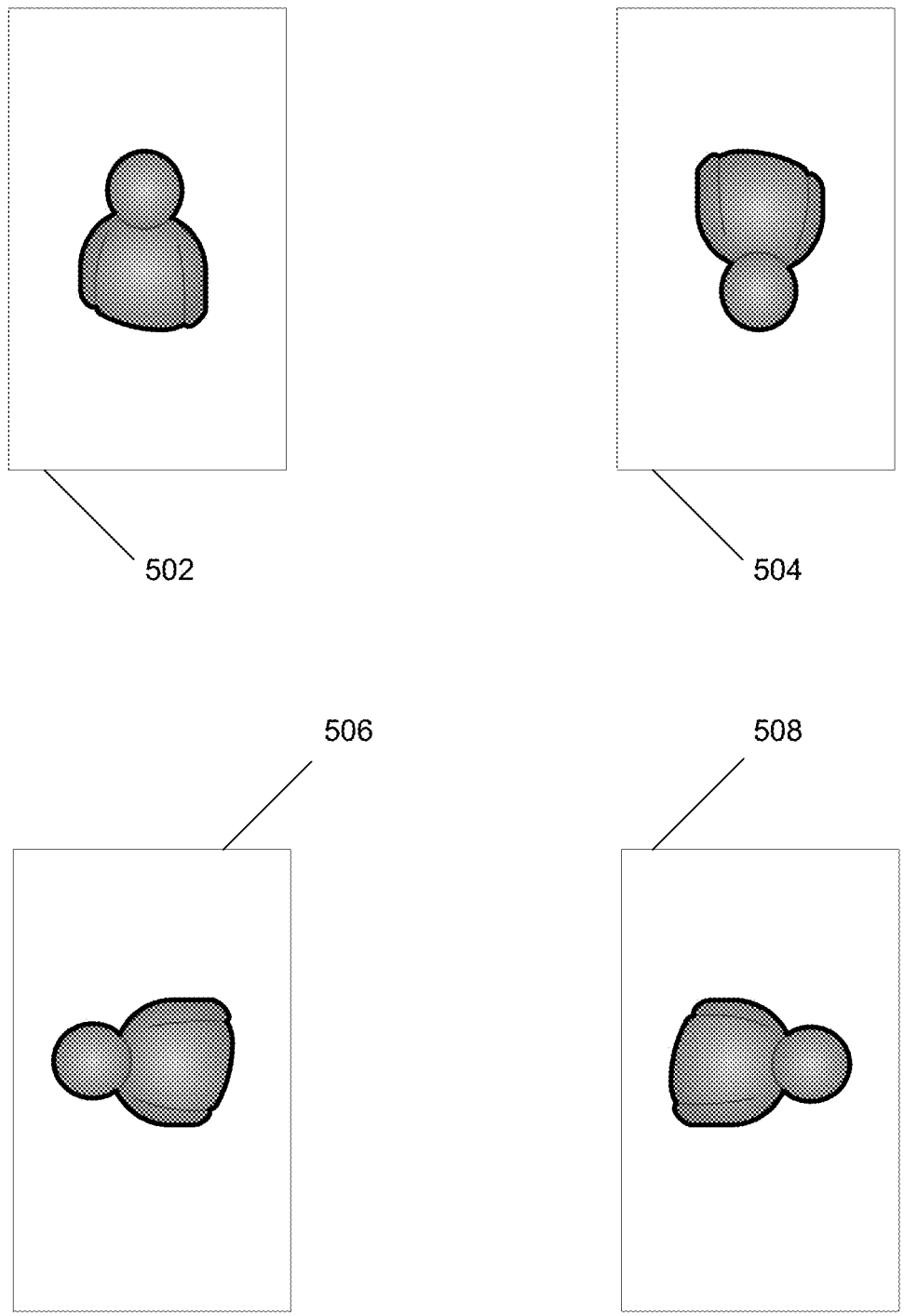
FIG. 5 is a depiction of different orientations of an image, according to an example.

In an example, the orientation may be determined to be portrait or landscape. In another example, as shown in FIG. 5, the orientation may be determined to be portrait-up 502, portrait-down 504, landscape-right 506, or landscape-left 508. The representations of these different orientations are depicted in FIG. 5 as they would appear if displayed on a display screen that is in portrait-up orientation. In one example, the portrait-up orientation may correspond to the typical orientation of a smart phone in which the camera is positioned at the top of the device. In particular, smart phone 225 in FIG. 2 can be considered to be in portrait-up orientation, while smart phone 215 in FIG. 2 can be considered to be in landscape-right orientation. Similarly, image 240 may be considered to be in portrait-up orientation whereas image 230 may be considered to be in landscape-right orientation.

The additional detail regarding the orientation (up, down, right, left) may be used to ensure that the image is rotated properly so that the final image appears right-side up. Additionally, when an expected orientation, as described below, is portrait-up, the portrait-down orientation may be interpreted as indicating to rotate the image by 180 degrees but not to change the aspect ratio.

At 406, the orientation expected by another device, along with an associated size, may be determined. As described above with reference to FIG. 2, an expected orientation may be an orientation that a receiving device expects to receive from a sending device. For example, the receiving device may be configured to process any received image data as if it is in the expected orientation. In other words, the receiving device may assume that any received image data is in the expected orientation. Additionally, an expected orientation may be an orientation that a sending device assumes that the receiving device is configured to receive (e.g., when the expected orientation is set as a default without explicit acknowledgement by the receiving device).

Computing device 100 may determine the expected orientation based on a value received from the other device, by referring to a value stored in memory, or the like. For instance, the expected orientation may be a default orientation or may be a selected or current orientation of the other device received from the other device at the beginning or during a communication session. The associated size may be an aspect ratio corresponding to the expected orientation. For example, an aspect ratio associated with portrait orientation may be 9:16 while an aspect ratio associated with landscape orientation may be the opposite, that is, 16:9.

At 408, it can be determined whether the orientation of the image is different from the expected orientation. For example, computing device 100 may use controller 130 to make such a determination by comparing the two orientations. If the orientations are represented as shown in FIG. 5, each of those orientations may be considered different from the others. Thus, for example, portrait-up orientation may be considered different from portrait-down orientation. In another example, however, the up, down, left, and right details may be ignored and the determination may be made simply based on the portrait or landscape information. Alternatively, the landscape-right and landscape-left distinction may be maintained and the portrait-up and portrait-down distinction may be ignored, since it may be a rare occurrence that a user may turn his phone upside down during a video call.

If determined that the image orientation and expected orientation do not differ (NO at 408), the method may proceed to 412 and transmit the image to the other device. For example, computing device 100 may transmit the image to the other device using communication interface 120.

If determined that the image orientation and expected orientation differ (YES at 408), the method may proceed to 410. At 410, the image may be modified to have the expected orientation and associated size. For example, computing device 100 may modify the image using controller 130 via image modification module 132, as described above with reference to FIGS. 1, 3, and 4. After the image has been modified, the method may proceed to 412, in which the modified image is transmitted to the other device. Computing device 100 may transmit the modified image to the other device using communication interface 120.

Figure 6:
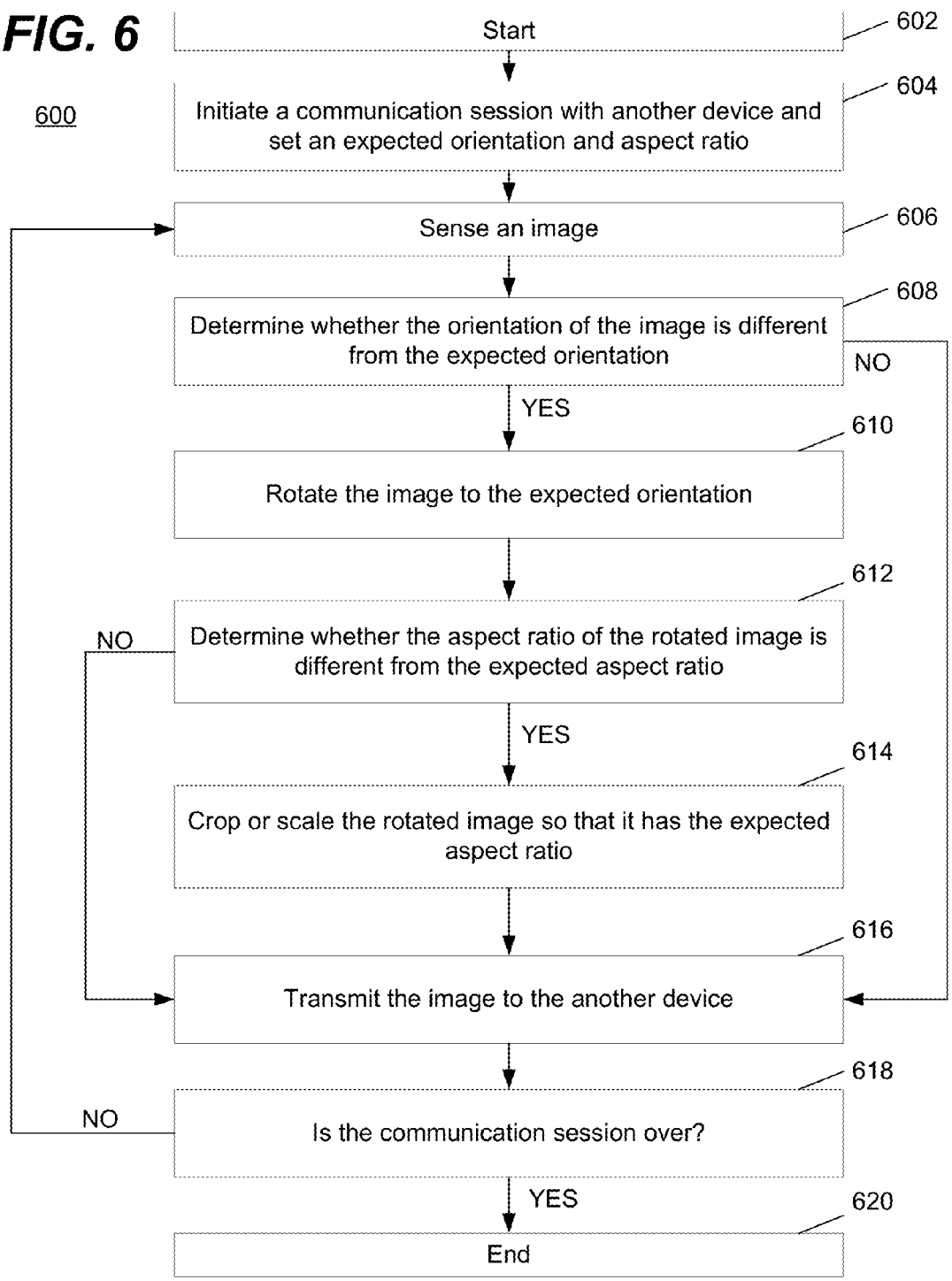
FIG. 6 is a flowchart illustrating aspects of a method for conducting a communication session with another device, according to an example.

FIG. 6 is a flowchart illustrating aspects of a method 600 executed by a computing device for conducting a communication session with another device, according to an example. Although execution of method 600 is described below with reference to the components of computing device 100, other suitable components for execution of method 600 can be used. Method 600 may be implemented in the form of executable instructions stored on a machine-readable medium or in the form of electronic circuitry. A processor, a machine-readable storage medium, other control logic, or a combination thereof can be used to execute method 600.

Method 600 may start at 602 and proceed to 604 where a communication session may be initiated with another device. For example, computing device 100 may request a video call with another device. The video call may be conducted and the image data transferred according to various standards and technologies such as Session Initiation Protocol (SIP), Real-time Transport Protocol (RTP), Secure Real-time Transport Protocol (SRTP), H.264, H.323, and the like.

During set-up of the video call, an orientation and aspect ratio may be set as an expected orientation and aspect ratio. For example, computing device 100 may set the expected orientation and aspect ratio by storing these values in memory. In an embodiment, a default orientation and aspect ratio may be set as the expected orientation and aspect ratio, such that any image transmitted during the call will be assumed to have the default orientation and aspect ratio. In some cases, an expected orientation may be specified and the aspect ratio may be implied. For example, the aspect ratio to be used may correspond to an aspect ratio associated with the image sensor of camera 110 when camera 110 is in the expected orientation. Alternatively, the aspect ratio may correspond to a display size or aspect ratio of the computing device 100 or of the other device when in the expected orientation.

Furthermore, the expected orientation and/or aspect ratio may not need to be specified between the devices. This may be the case if both devices are running the same computer program, or perhaps if both devices are the same model. For example, the program may have a hard-coded default orientation which may be used. In another example, the orientation and aspect ratio may be communicated and agreed upon between the two devices. For example, computing device 100, which initiated the call, may select the orientation based on its current orientation and communicate the selected orientation to the other device. Alternatively, the other device, which received the request for a call, may select the orientation based on its current orientation and communicate the selected orientation to computing device 100. Additionally, as described above, a corresponding aspect ratio may not need to be communicated between the two devices, though it may be in some cases.

At 606, an image may be sensed. For example, computing device 100 may sense an image using camera 110. At 608, it can be determined whether the orientation of the image is different from the set orientation. If the orientations are not different (NO at 608), the method may proceed to 616, where the image may be transmitted to the other device. For example, computing device 100 may transmit the image to the other device using communication interface 120. In this case, the method would then proceed to 618, where it can be determined whether the communication session is over. If the communication session is not over (NO at 618), the method may proceed to 606 to continue the process. If the communication session is over (YES at 618), the method may proceed to 620, where the process is ended.

On the other hand, if the orientations are different (YES at 608), the method may proceed to 610. At 610, the image may be rotated to the expected orientation. For example, computing device 100 may rotate the image using image modification module 132 of controller 130.

Rotating the image to the expected orientation signifies that the image is rotated so that the orientation of the image would be correctly displayed if the image were displayed on a device having the expected orientation. For example, referring to FIG. 3, image 301 has a landscape-right orientation. Assuming that the expected orientation is portrait-up, image 301 may be rotated right 90 degrees so that the image would be correctly oriented on a device having portrait-up orientation. When so rotated, image 301 would appear as image 302 in FIG. 3. As another example, image 504 in FIG. 5 has a portrait-down orientation. Assuming that the set orientation is portrait-up, image 504 may be rotated right or left 180 degrees so that the image would be correctly oriented on a device having portrait-up orientation.

At 612, it can be determined whether the aspect ratio of the rotated image is different from the expected aspect ratio. If the image aspect ratio is not different from the expected aspect ratio (NO at 612), the method may proceed to 616. If the image aspect ratio is different from the expected aspect ratio (YES at 612), the method may proceed to 614. At 614, the rotated image may be cropped and/or scaled so that the rotated image has the expected aspect ratio. For example, computing device 100 may crop and/or scale the rotated image using image modification module 132 of controller 130.

By way of illustration, according to an example, if the original image was in landscape-right orientation, as depicted by image 301 in FIG. 3, the rotated image would appear as image 302. As discussed earlier, this image has a 16:9 aspect ratio. However, if the expected aspect ratio corresponding to the expected orientation (here, portrait-up) is 9:16, then the aspect ratios would differ. Accordingly, the image 302 may be modified using cropping and/or scaling so that it appears as image 304, with an aspect ratio of 9:16. On the other hand, if the original image was in portrait-down orientation, as depicted by image 504 in FIG. 5, the rotated image would appear as image 502. Assuming that image 502 has an aspect ratio of 9:16, cropping and scaling could be skipped since the image already has the expected aspect ratio. Accordingly, this case would result in a NO at 612.

The method may then proceed to 616, where the modified image may be transmitted to the other device. For example, computing device 100 may transmit the image using communication interface 120. At 618, it may be determined whether the communication session is over and the process may either continue (NO at 618) or end (YES at 618).

In some embodiments the set orientation and aspect ratio may be changed during the communication session. For example, if the orientation of the other device changes during the communication session, it may be beneficial for the other device to communicate this to computing device 100 so that properly oriented and sized images may be transmitted to the other device.

Figure 7:
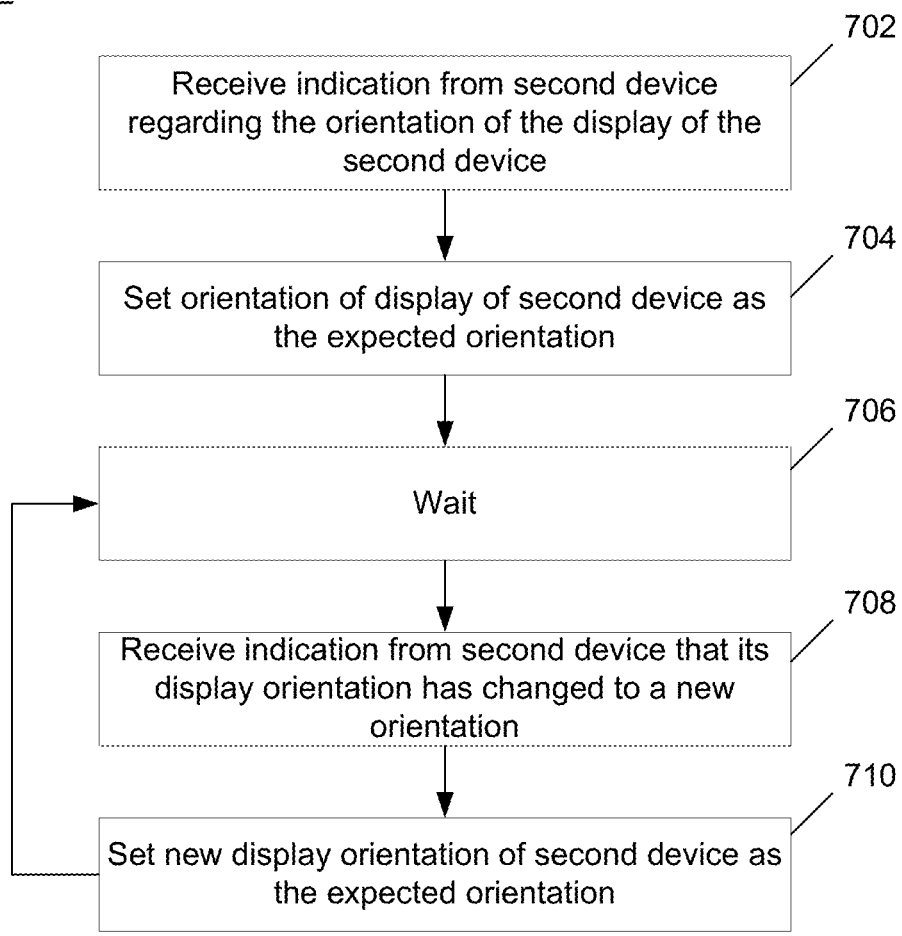
FIG. 7 is a flowchart illustrating aspects of a method for setting and updating an orientation received from another device, according to an example.

In particular, FIG. 7 is a flowchart illustrating aspects of a method 700 executed by computing device 100 for setting and updating an orientation received from another device. Although execution of method 700 is described below with reference to the components of computing device 100, other suitable components for execution of method 700 can be used. Method 700 may be implemented in the form of executable instructions stored on a machine-readable medium or in the form of electronic circuitry. A processor, a machine-readable storage medium, other control logic, or a combination thereof can be used to execute method 700.

Method 700 may start at 702 where an indication is received from a second device regarding the orientation of the display of the second device. For example, computing device 100 may receive this indication using communication interface 120. In addition, an indication may also be received regarding the associated aspect ratio, although computing device 100 may be capable of determining the associated aspect ratio without such an indication. At 704, the orientation of the display of the second device may be set as the expected orientation. Additionally, the aspect ratio may be set as well. The processing of 704 may correspond to the processing of 604 in FIG. 6, for example.

At 706, computing device 100 may wait. Waiting may be an active process of computing device 100. For example, a module responsible for setting the expected orientation and aspect ratio may remain active. Alternatively, waiting may be a passive process of computing device 100. For example, waiting may simply signify that computing device 100 is capable of receiving an update regarding the second device's orientation. In particular, upon receiving such an update, computing device 100 may call or activate a module responsible for updating the expected orientation and aspect ratio.

At 708, an indication may be received from the second device that the display orientation of the second device has changed to a new orientation. In addition, an indication may also be received regarding the aspect ratio associated with the display in the new orientation, although computing device 100 may be capable of determining the new aspect ratio without such an indication.

At 710, the new display orientation of the second device may be set as the expected orientation. Additionally, the new aspect ratio may also be set. The method may then proceed to 706, where computing device 100 may wait for a new update.

Figure 8:
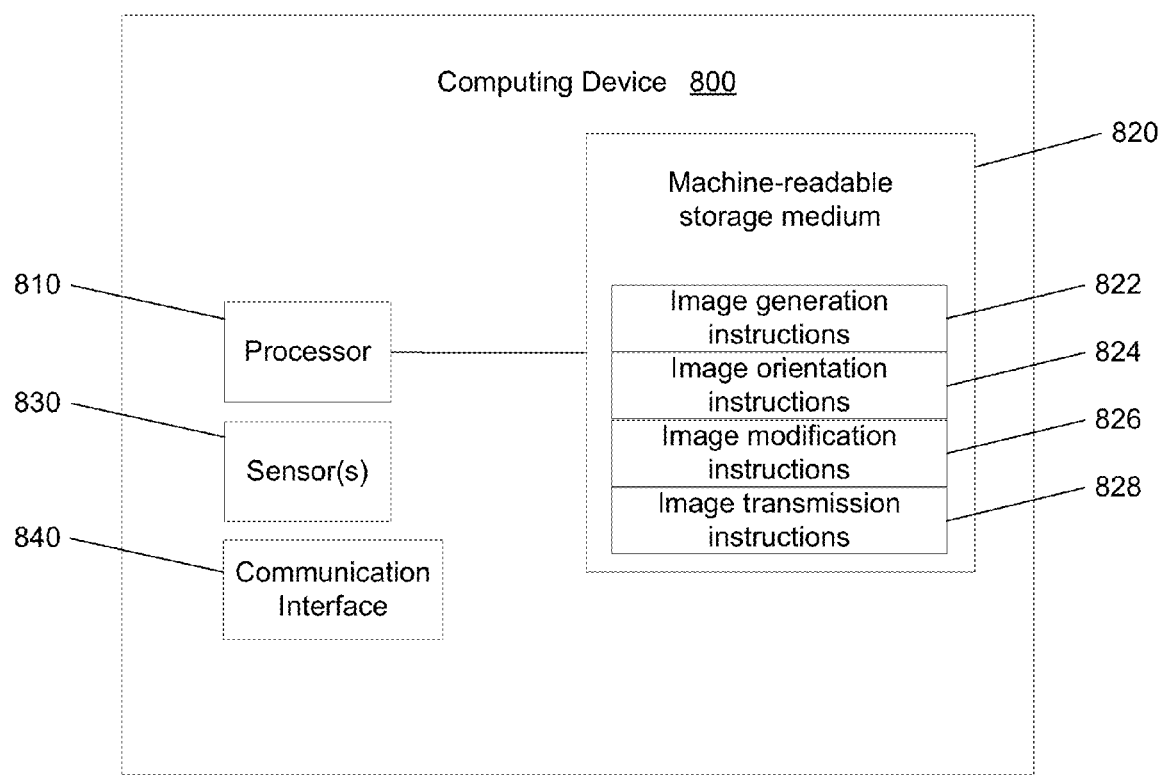
FIG. 8 is a block diagram illustrating a computing device including a machine-readable storage medium encoded with instructions to modify image data, according to an example.

FIG. 8 is a block diagram illustrating aspects of a computing device 800 including a machine-readable storage medium 820 encoded with instructions to modify image data, according to an example. Computing device 800 may be, for example, a communication device such as a cellular telephone, a smart phone, or a computer. The computer can be a tablet computer, a slate computer, a laptop computer, a desktop computer, or the like.

Processor 810 may be at least one central processing unit (CPU), at least one semiconductor-based microprocessor, at least one digital signal processor (DSP) such as a digital image processing unit, other hardware devices or processing elements suitable to retrieve and execute instructions stored in machine-readable storage medium 820, or combinations thereof. Processor 810 can include single or multiple cores on a chip, multiple cores across multiple chips, multiple cores across multiple devices, or combinations thereof. Processor 810 may fetch, decode, and execute instructions 822, 824, 826, 828 to implement image generation, processing, and transmission. As an alternative or in addition to retrieving and executing instructions, processor 810 may include at least one integrated circuit (IC), other control logic, other electronic circuits, or combinations thereof that include a number of electronic components for performing the functionality of instructions 822, 824, 826, 828. Accordingly, processor 810 may be implemented across multiple processing units and instructions 822, 824, 826, 828 may be implemented by different processing units in different areas of computing device 800.

Machine-readable storage medium 820 may be any electronic, magnetic, optical, or other physical storage device that contains or stores executable instructions. Thus, the machine-readable storage medium may comprise, for example, various Random Access Memory (RAM), Read Only Memory (ROM), flash memory, and combinations thereof. For example, the machine-readable medium may include a Non-Volatile Random Access Memory (NVRAM), an Electrically Erasable Programmable Read-Only Memory (EEPROM), a storage drive, a NAND flash memory, and the like. Further, the machine-readable storage medium 820 can be computer-readable and non-transitory. Machine-readable storage medium 820 may be encoded with a series of executable instructions for generating, processing, and transmitting images.

The instructions 822, 824, 826, 828, when executed by processor 810 (e.g., via one processing element or multiple processing elements of the processor) can cause processor 810 to perform processes, for example, the processes depicted in FIGS. 4, 6, and 7. Furthermore, computing device 800 may be similar to computing device 100 and may have similar functionality and be used in similar ways, as described above.

Image generation instructions 822 can cause processor 810 to generate an image using sensor(s) 830. Sensor(s) 830 may include an image sensor, a camera, or the like. Sensor(s) 830 may also include an orientation sensor, such as an accelerometer. Image orientation instructions 824 can cause processor 810 to determine an orientation of the generated image. For example, image orientation instructions 824 may use sensor(s) 830 to determine the orientation based on a value from an accelerometer. Additionally or alternatively, image orientation instructions may determine the orientation of the image using object recognition techniques by determining the orientation of objects in the generated image itself.

Image orientation instructions 824 can also cause processor 810 to determine an orientation associated with a second communication device. The second communication device could be a computing device with which computing device 100 is communicating. Determining the orientation associated with the second communication device could be accomplished, for example, by accessing a stored value in memory, such as machine-readable storage medium 810. Image modification instructions 826 can cause processor 810 to modify the image by rotating the image and changing the resolution of the rotated image if determined that the orientation of the generated image and the orientation associated with the second communication device differ.

By way of illustration, FIG. 3 illustrates how the image can be modified by image modification instructions 826, in one example. For instance, the image can be rotated as illustrated by images 301 and 302, where image 301 is rotated right 90 degrees to appear as image 302. Additionally, the resolution of the image can be changed as illustrated by the sequence of images 302, 303, and 304. In particular, image 302 is cropped as shown in image 303 to arrive at image 304, which has a smaller resolution than image 302. Scaling may also be applied in some circumstances.

In an embodiment, changing the resolution of the rotated image can be performed so that the final image to be transmitted to the second communication device has a resolution associated with the orientation of the second communication device. Resolution may be associated with the orientation of the second communication device by way of aspect ratio. For example, the second communication device may have a display with an aspect ratio of 9:16 in portrait orientation and 16:9 in landscape orientation. Thus, if the orientation of the second communication device is portrait, than the associated aspect ratio is 9:16. A resolution having the same aspect ratio may thus be associated with the orientation of the second communication device. Accordingly, in this example, the rotated image can be modified to have a resolution associated with the orientation of the second communication device by changing the resolution of the rotated image such that the resolution corresponds to an aspect ratio of 9:16.

Image transmission instructions 828 can cause processor 810 to transmit the modified image to the second communication device. For example, processor 810 may transmit the modified image to the second communication device using communication interface 840.

What is claimed is:

1. A computing device comprising:
    a camera to generate image data;
    a communication interface to receive display aspect ratio from a second computing device; and
    a controller to:
        modify an aspect ratio of the image data to the display aspect ratio received from the second computing device in response to a determination that the aspect ratio of the image data is different from the display aspect ratio; and
        transmit the modified image data to the second device.

2. The computing device of claim 1, wherein:
    the communication interface is further to receive a display orientation from the second device; and
    the controller is further to:
        store the display orientation received from the second computing device in a memory of the first device as an expected orientation of the second device; and
        generate the modified image data based on the stored expected orientation.

3. The computing device of claim 1, wherein the display aspect ratio is a ratio represented by a width of a display area of a display of the second computing device by a height of the display area when the display is oriented according to the display orientation.

4. The computing device of claim 1, wherein the controller is to modify the aspect ratio of the image data by cropping the image data.

5. The computing device of claim 1, wherein the controller is to transmit the modified image data during a video call with the second computing device.

6. A method comprising:
    sensing, by an image sensor of a first device, an image having a first aspect ratio;
    determining, by the first device, a second aspect ratio expected by a second device in communication with the first device;
    in response to a determination that the first aspect ratio is different from the second aspect ratio, modifying the image by the first device so that the image has the second aspect ratio; and
    transmitting the modified image from the first device to the second device.

7. The method of claim 6, comprising:
    storing a display orientation expected by the second device in a storage of the first device as an expected orientation of the second device; and
    modifying, by the first device, the image based on the stored expected orientation.

8. The method of claim 7, further comprising:
    receiving, by the first device, an indication from the second device that the orientation of the display of the second device has changed to a different orientation; and
    updating, by the first device, the stored expected orientation to be the different orientation.

9. The method of claim 6, wherein modifying the image so that the has the second aspect ratio comprises cropping the image.

10. The method of claim 9, wherein modifying the image so that the image has the second aspect ratio further comprises scaling the image.

11. The method of claim 10,
    wherein the image comprises a depiction of a face, and
    wherein the at least one of scaling the image and cropping the image is performed such that the depiction of the face is retained in the modified image.

12. The method of claim 6, wherein the second aspect ratio is a ratio represented by a width of a display area of a display of the second computing device by a height of the display area when the display is oriented according to the display orientation.

13. The method of claim 6, wherein the first device and the second device are in communication to establish a video call.

14. An article comprising a non-transitory machine-readable storage medium storing instructions that upon execution cause a processor of a first communication device to:
    receive a display aspect ratio from a second computing device;
    generate image data using an image sensor;
    modify an aspect ratio of the image data to the display aspect ratio received from the second computing device in response to a determination that the aspect ratio of the image data is different from the display aspect ratio; and
    transmit the modified image data to the second device.

15. The article of claim 14, further comprising instructions to:
    store a display orientation expected by the second device in a storage of the first device as an expected orientation of the second device; and
    modify the image based on the stored expected orientation.

16. The article of claim 15, further comprising instructions to:
    receive an indication from the second device that the orientation of the display of the second device has changed to a different orientation; and
    update the stored expected orientation to be the different orientation.

17. The article of claim 14, further comprising instructions to crop the image based on the display aspect ratio.

18. The article of claim 14, further comprising instructions to scale the image based on the display aspect ratio.

19. The article of claim 14, wherein the display aspect ratio is a ratio represented by a width of a display area of a display of the second computing device by a height of the display area when the display is oriented according to the display orientation.

20. The article of claim 14, wherein the first communication device is to transmit the modified image data during a video call with the second communication device.

* * * * *